July 24, 1956

C. C. HOUTZ ET AL 2,756,373

ELECTROLYTIC CAPACITORS

Filed July 10, 1952

TANTALUM FOIL ETCHED WITH HALOGEN VAPOR

INVENTORS C. C. HOUTZ
D. A. McLEAN
BY
ATTORNEY

United States Patent Office 2,756,373
Patented July 24, 1956

2,756,373

ELECTROLYTIC CAPACITORS

Charles C. Houtz, Bernardsville, and David A. McLean, Chatham, N. J., assignors to Bell Telephone Laboratories, Incorporated, New York, N. Y., a corporation of New York Application July 10, 1952, Serial No. 298,102

3 Claims. (Cl. 317—230)

This invention relates to electrolytic capacitors and more particularly it relates to the manufacture of electrolytic capacitors in which at least one of the electrodes is formed of tantalum.

According to the present invention the surface of a tantalum electrode for use in an electrolytic capacitor is subjected to the action of a halogen vapor at an elevated temperature. Electrolytic condensers made from electrodes so treated have been found to have a considerably reduced tendency to deteriorate in capacity and power factor during use as compared to electrolytic capacitors formed from tantalum electrodes which have not been treated with halogen vapor.

Figure 1:
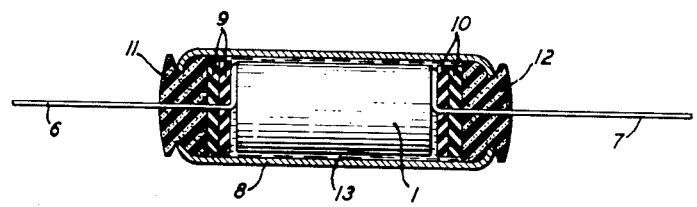
Figure 2:
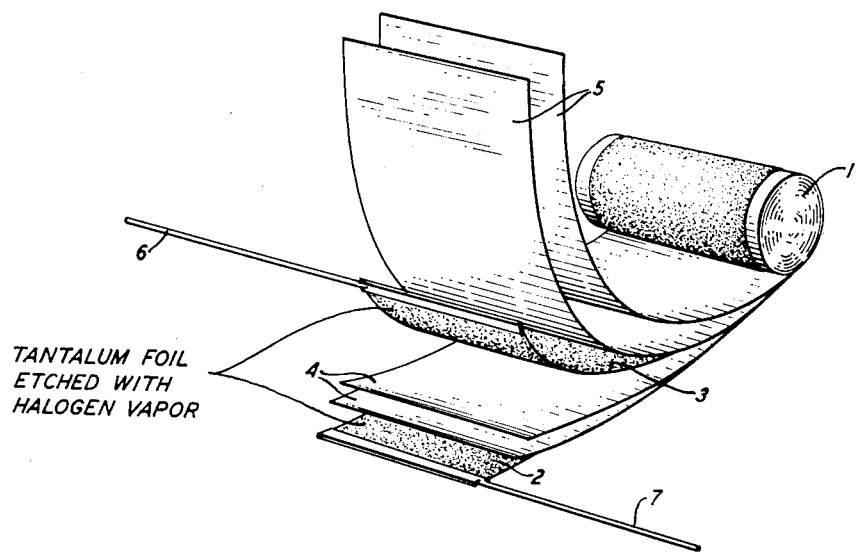

A type of electrolytic capacitor which may be prepared according to the present invention is shown in the accompanying drawing in which:

Fig. 1 is a front elevation, in section, of an electrolytic capacitor of the present invention completely enclosed in a can; and Fig. 2 is a perspective view of the capacitor unit only, which is shown partly unrolled so that its structure can be seen.

In the drawing, the condenser unit 1 is of the rolled foil type being made up of a pair of tantalum foils 2, 3, spaced from one another by double layers 4, 5 of condenser paper. The assembly of foil and paper is rolled into a compact cylinder. Tantalum terminals 6, 7 are fastened to the ends of the respective tantalum foils, as by spot welding.

The condenser unit 1, impregnated with an electrolyte, is enclosed in a tubular can 8 formed of a suitable material such as silver-plated copper. The terminals 6, 7 extend from the respective ends of the tubular can, passing successively through disc-shaped insulating spacers 9, 10 and cylindrical rubbery sealing plugs 11, 12. The two ends of the tubular can 8 are crimped over the respective sealing plugs 11, 12 so as to form a tight seal. The free space within the can is filled with electrolyte 13.

In the manufacture of a condenser of this type according to the present invention, the tantalum electrode foils 2, 3 with their attached tantalum terminals 6, 7, prior to their interleaving with the paper spacers, are subjected to the treatment with halogen vapor which was referred to above. In this treatment the surfaces of the foils and terminals are exposed to the vapor of a halogen at a temperature sufficiently elevated to cause the halogen to react with the tantalum at a practical rate. Preferably the halogen vapor is chlorine.

When the tantalum electrodes are treated with chlorine, the treatment is ordinarily carried out at a temperature of at least 350° C., preferably at least 375° C., and more preferably in the vicinity of 400° C. Higher temperatures, for instance up to 600° C., 700° C., 800° C. or higher may be used, if desired, but the increased reaction velocity at these higher temperatures gives little additional practical advantage.

When the foils are exposed to a halogen as described above, their surfaces become etched due to the formation of the corresponding tantalum halides, which are volatile at the temperatures employed. The effectiveness of this etching treatment in improving the characteristics of the condenser has been found to be dependent upon the amount of tantalum removed during treatment. The best results have been obtained when the amount of tantalum removed has been about .1 gram per square inch. Removal of larger amounts of tantalum is permissible, but does not give greatly improved results. Preferably at least .03 gram per square inch, and more preferably at least .05 gram per square inch, of tantalum are removed, although the benefits of the present invention can be obtained with even a smaller degree of etching corresponding to tantalum removals of as little as .01 gram per square inch.

The degree of etching of the tantalum foils can be controlled either by limiting the amount of halogen vapor contained in the atmosphere to which the foils are exposed or by limiting the time during which the foils are in contact with the halogen-containing atmosphere. Thus, an etch corresponding to a tantalum removal of about .1 gram per square inch was obtained by placing the foil in a closed container having a gas volume of 32 cubic centimeters per square inch of total foil surface. This volume was filled with chlorine under a gas pressure of 746 millimeters of mercury at 25° C. and the system was heated to 400° C. for one hour. At the end of that time, it was found that all of the chlorine present had been reacted.

Similarly, an etch corresponding to a tantalum removal of about .03 gram per square inch was obtained by exposing a tantalum foil to a volume of chlorine corresponding to about 33 cubic centimeters per square inch of total foil surface at a gas pressure of 249 millimeters of mercury at 25° C. This system was also heated to 400° C. for one hour at which time all of the chlorine had been reacted. Under similar conditions an etch corresponding to a tantalum removal of .01 gram per square inch was obtained with an amount of chlorine corresponding to about 31 cubic centimeters per square inch of foil surface at a gas pressure of 88 millimeters of mercury at 25° C.

After etching, the tantalum foils and terminals are formed in any conventional forming electrolyte, such as an aqueous boric acid solution or an aqueous solution of a glyco-borate formed by the reaction of boric acid or ammonium borate with ethylene glycol. Conventional forming voltages as, for instance, 200 volts direct current, and conventional forming times, are employed.

The formed electrodes are then interleaved with the paper spacer sheets 4, 5 and are rolled into cylindrical form to form the finished condenser unit. This unit is then impregnated with a conventional electrolyte. Preferably an electrolyte of the viscous type, such as an aqueous or non-aqueous glyco-borate, is employed. Thus, a suitable electrolyte is made up of about 50 per cent ethylene glycol, 15 per cent ammonium borate and 35 per cent water. Analogous non-aqueous electrolytes can be formed by substituting other organic solvents, such as triethanolamine, for the water in the above-mentioned electrolyte or other aqueous electrolyte.

Preferably the impregnation is carried out at an elevated temperature to reduce the viscosity of the electrolyte. Impregnation can conveniently be carried out by immersing the condenser unit in the electrolyte at about 110° C. for about 20 minutes with the application of intermittent partial vacuum. When the impregnated condenser unit 1 is placed within the can 8, the free space between the can and the unit is filled with additional electrolyte 13.

The improvement achieved by forming condensers from tantalum electrodes etched as described above is readily shown by accelerated life tests. In such an accelerated test, etched tantalum electrodes and unetched tantalum electrodes were subjected to a forming voltage of 200 volts direct current for about 500 minutes. This treatment can be considered to correspond to a standard commercial formation plus several years of service life. It was found that at the end of this treatment, a capacity of .28 microfarad was obtained with the unetched tantalum electrode, whereas a capacity of .35 microfarad was obtained with the tantalum electrode which had been subjected to an etch corresponding to a removal of .1 gram of tantalum per square inch. The less severely etched tantalum electrodes did not show as great an improvement but were superior to the unetched electrode.

Similarly, after the accelerated test referred to above, the power factor obtained with the severely etched tantalum electrode had a value of 4 per cent as compared to a value of 7.5 per cent for the unetched electrode.

The higher capacity exhibited at the end of the test by condensers formed of the etched electrodes is due to improvement of the stability of the dielectric oxide layer formed on the etched tantalum surface and not to increased surface area produced by etching. This is shown by the fact that after a 15-minute formation at 200 volts, both the etched and the unetched foils produced substantially the same capacity. At much lower formation voltages, the etched foils produce higher initial capacities than do the unetched foils presumably due to a greater surface area resulting from microscopic irregularities produced by etching. However, at the higher formation voltages, thicker oxide films are formed on the surface of the tantalum which tend to cover completely these smaller irregularities and thus to reduce both the etched and unetched foils to essentially the same surface area.

The invention has been described above in terms of specific embodiments and, since certain modifications and equivalents may be apparent to those skilled in the art, this description is intended to be illustrative of, but not necessarily to constitute a limitation upon, the scope of the invention.

What is claimed is:
1. An electrolytic capacitor having an anode prepared by contacting the surface of a tantalum body with chlorine at a temperature of at least 350° C. until at least .01 gram of metal per square inch has been removed from said surface by the action of the chlorine and then anodically forming an oxide film on said surface.

2. An electrolytic capacitor comprising a pair of tantalum foils spaced by paper spacers impregnated with an electrolyte, said foils having surfaces prepared by contacting them with chlorine at a temperature in the vicinity of 400° C. until at least .05 gram of metal has been removed from the surface of said foil by the action of the chlorine and then anodically forming an oxide film on said surface.

3. An electrolytic capacitor comprising a pair of tantalum foils spaced by paper spacers impregnated with a glycoborate electrolyte, said foils having surfaces prepared by contacting them with chlorine at a temperature in the vicinity of 400° C. until about .1 gram of metal per square inch has been removed from the surface of said foils by the action of chlorine and then anodically forming an oxide film on said surface.

References Cited in the file of this patent
UNITED STATES PATENTS

| | | |
|---|---|---|
| 1,330,581 | Caulson | Feb. 10, 1920 |
| 2,206,050 | Robinson | July 2, 1940 |

OTHER REFERENCES

Mellor: Compr. Treatise on Inorg. and Theoretical Chemistry, vol. 9, Longman's Green & Co., N. Y., 1929, page 891. First paragraph.

Uhlig: Corrosion Handbook, 1948, John Wiley & Sons, page 722, lines 1–5.